United States Patent Office 2,891,934
Patented June 23, 1959

2,891,934
COPOLYMER OF DIFLUOROVINYL CHLORIDE AND VINYL ACETATE

John F. Olin, Ambler, Pa., assignor to Pennsalt Chemicals Corporation, a corporation of Pennsylvania No Drawing. Application September 30, 1955
Serial No. 537,883

4 Claims. (Cl. 260—87.1)

This invention relates to new polymeric materials and more particularly to copolymers of 1-chloro-2,2-difluoroethylene and to processes of preparing the same.

1-chloro-2,2-difluoroethylene, also called difluorovinyl chloride, has long been investigated as a potentially polymerizable material.

However, although it is structurally similar to other vinyl monomers, the difficulty encountered in its polymerization has set it apart from such monomers as vinyl chloride, vinyl fluoride, vinyl acetate, acrylonitrile, etc. Thus, polymerization processes generally applied to most vinyl type monomers, when applied to difluorovinyl chloride, yield only traces of homopolymeric substances of very low molecular weight.

Attempts by the present applicant over a long period of time to copolymerize difluorovinyl chloride with other common monomers such as vinyl chloride, acrylonitrile, and styrene have been unsuccessful. Not only did copolymerization not take place but in some instances the presence of difluorovinyl chloride inhibited homopolymerization of the comonomer being used.

It has now been found that although difluorovinyl chloride will not copolymerize with most of the other vinyl type monomers, it will readily copolymerize with vinyl acetate to form useful polymeric substances.

In practicing the process of this invention difluorovinyl chloride and vinyl acetate are mixed and subjected to polymerization conditions. Emulsion polymerization conditions are preferred but other known polymerization techniques such as mass or solution polymerization may also be used. In a preferred embodiment of my invention the two monomers are mixed with water, an emulsifying agent and a catalyst or free-radical polymerization initiator and the mixture agitated. The degree and rate of polymerization may advantageously be controlled by varying the amount of catalyst used and the temperature.

The proportions of difluorovinyl chloride and vinyl acetate monomers used may be varied considerably within the scope of the invention, depending on the properties desired in the copolymer. However, since a molecule of difluorovinyl chloride does not readily attach itself to another molecule of difluorovinyl chloride, the proportion of this monomer in preferred operation does not usually exceed 50 mol percent. As little as 0.5 mol percent difluorovinyl chloride may be used advantageously in practicing my invention. The preferred proportions are 5 to 30 mol percent difluorovinyl chloride and 95 to 70 mol percent vinyl acetate.

The copolymerization reaction according to my invention may be carried out at temperatures of from below 0° C. to the critical temperature of difluorovinyl chloride, which is about 122° C. The preferred reaction temperature is from 5° to 60° C.

In emulsion polymerization, the amount of water used in carrying out the polymerization is not critical but for practical purposes it is preferred to use an amount of from 1 to 2 times the combined weights of the monomers. A sodium salt of an alkyl aryl polyether sulfonate, known under the trade name of Triton X-200 and having the structural formula

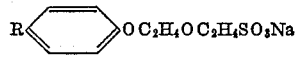

where R is $(CH_3)_3CCH_2C(CH_3)_2$, and an alkyl aryl polyether alcohol, known under the trade name of Triton X-100 and having the structural formula

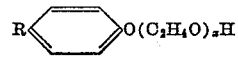

where R is $(CH_3)_3CCH_2C(CH_3)_2$ and $x$ is 8 to 10, have been used as emulsifying agents in this polymerization although other conventional emulsifying agents may also be used. (Ind. Eng. Chem. 46, 1930–34 (1954), Jelinek and Mayhew, "Nonionic Detergents"; and "Surface Active Agents," A. M. Schwartz and J. W. Perry, Interscience Publishers, Inc., 1949, p. 109.) The amount of emulsifying agent may be varied from about 0.1% to about 15% of the combined weight of the monomers, although the preferred amount is from 1% to 10%.

A number of materials are known to the art as emulsion polymerization catalysts or free-radical polymerization initiators and almost any of these may be used. A few examples of such materials are peroxy compounds including oxygen, ozone, hydrogen peroxide, benzoyl peroxide, cumene hydroperoxide and other organic peroxides, organic ozonides, percarbonates, perborates, perchlorates, and persulfates. The preferred catalysts in the practice of my invention are the persulfates of ammonium, sodium and potassium. The speed of the polymerization reaction is partially dependent on the amount of catalyst used, and in operating the process of my invention with potassium persulfate as catalyst, the amount may be varied from about 0.1% to about 2% of the combined monomer weights, although the preferred amount is about 0.5%.

Although the objects of my invention are to make available new copolymers of difluorovinyl chloride and vinyl acetate and processes for preparing these copolymers, it is to be understood also that in some cases the products of my invention may contain homopolymers of vinyl acetate in addition to the said copolymers. This is particularly true when the copolymerization is carried out using only a very small proportion of difluorovinyl chloride monomer. One special value of the copolymerization process under those conditions is the effect it has in decreasing the "gel" or excessively high molecular weight polymer content of the vinyl acetate homopolymer.

In general the copolymers of difluorovinyl chloride and vinyl acetate which have the most valuable properties are thermoplastic solids, although valuable products ranging from viscous liquids to hard solids at ordinary temperatures may also be prepared, depending on the application desired, by varying the degree of polymerization. Polymeric products prepared according to my invention may contain from 0.5 to 50 mol percent combined difluorovinyl chloride and from 99.5 to 50 mol percent combined vinyl acetate but preferred products contain from 5 to 30 mol percent combined difluorovinyl chloride and 95 to 70 mol percent combined vinyl acetate, and are especially valuable for their adhesive properties.

The new polymeric products of this invention possess many other desirable properties due to the incorporation of the fluorine containing monomer. A lowered working temperature has been achieved coupled with an enhanced thermal stability, making these copolymers more useful for injection molding, for example. The hydrophilic character of their films and fibers has been decreased, providing a surface coating more water repellant than the original vinyl acetate homopolymer. The solubility characteristics are such that films and coatings may readily be deposited from volatile solvents.

The adhesion of difluorovinyl chloride and vinyl acetate copolymer films to glass has been found to be considerably greater than that of vinyl acetate homopolymer. Films prepared from copolymer containing as little as 10% combined difluorovinyl chloride have been found to be extremely difficult to remove from glass, and this adhesive property increases with difluorovinyl chloride content.

From the foregoing disclosure it is clear that the new polymeric products of this invention possess important characteristics not possessed by polymers heretofore available, and can be used to advantage in a large number of commercial products, such as paints and other protective coatings, adhesives, shaped objects, sealing compounds, and plasticized films and sheets.

The invention and its practice are further illustrated by the following examples, in which the parts are by weight:

Example 1

A pressure reactor was charged with 50 parts of difluorovinyl chloride, 50 parts of vinyl acetate, 150 parts of water, 3 parts of Triton X–200, and 0.5 parts of potassium persulfate and closed. The reactor was then agitated at 50° C. for 47 hours. 73 parts of a white, powdery, solid polymer soluble in oxygen-containing solvents such as methylethyl ketone were obtained.

Example 2

A pressure reactor was charged with 25 parts of difluorovinyl chloride, 75 parts of vinyl acetate, 150 parts of water, 3 parts of Triton X–200, and 0.5 parts of potassium persulfate and closed. The reactor was then agitated at 40° C. for 40 hours. 86 parts of a white, powdery, solid polymer soluble in oxygen-containing solvents such as methylethyl ketone were obtained.

Example 3

To demonstrate the unique character of the above discussed copolymerization, a pressure reactor was charged with 100 parts of difluorovinyl chloride, 150 parts of water, 3 parts of Triton X–200, and 0.5 parts of potassium persulfate and closed. The reactor was then agitated at 50° C. for 47 hours. On opening the reactor at the end of this reaction period all of the difluorovinyl chloride was recovered unreacted. No polymer was obtained.

Example 4

To further illustrate the unique character of my invention a pressure reactor was charged with 50 parts of difluorovinyl chloride, 50 parts of vinyl chloride, 150 parts of water, 3 parts of Triton X–200, and 0.5 parts of potassium persulfate and closed. The reactor was then agitated at 50° C. for 47 hours. 30 parts of polyvinyl chloride polymer, containing no fluorine, were obtained.

As many widely different embodiments of this invention may be made without departing from the scope and spirit of it, it is to be understood that my invention includes all such embodiments and is not to be limited by the above description.

I claim:

1. A copolymer of 1-chloro-2,2-difluoroethylene and vinyl acetate containing from 0.5 mol percent to 50 mol percent combined 1-chloro-2,2-difluoroethylene and from 99.5 mol percent to 50 mol percent combined vinyl acetate.

2. A copolymer of 1-chloro-2,2-difluoroethylene and vinyl acetate containing from 5 mol percent to 30 mol percent combined 1-chloro-2,2-difluoroethylene and from 95 mol percent to 70 mol percent combined vinyl acetate.

3. A process for preparing a copolymer of 1-chloro-2,2-difluoroethylene and vinyl acetate which comprises subjecting 1 part by weight of a mixture of from .5 to 50 mol percent of 1-chloro-2,2-difluoroethylene monomer and from 99.5 to 50 mol percent of vinyl acetate monomer in from 1 to 2 parts by weight of an emulsifying agent selected from the group of compounds consisting of sodium salt of an alkyl aryl polyether sulfonate having the formula

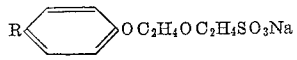

and an alkyl aryl polyether alcohol having the formula

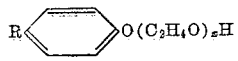

in which formulas R is $(CH_3)_3CCH_2C(CH_3)_2$ and $x$ is 8 to 10 to the action of from .001 to .02 part by weight of a free-radical polymerization initiator selected from the group consisting of ammonium persulfate, sodium persulfate and potassium persulfate in a pressure vessel at a temperature in the range of from about 0° to 122° C.

4. The process for preparing a copolymer of 1-chloro-2,2-difluoroethylene and vinyl acetate which comprises polymerizing in the temperature range of from about 0° C. to 122° C. a mixture containing from 0.5 to 50 mol percent of the monomer 1-chloro-2,2-difluoroethylene and from 99.5 to 50 mol percent of the monomer vinyl acetate in an amount of water equal to from 1 to 2 times the combined weights of said monomers and in the presence of from 0.1% to 15% of emulsifying agent and from 0.1% to 2% of free-radical polymerization initiator, said percentages being based on the combined weights of said monomers.

References Cited in the file of this patent

UNITED STATES PATENTS

| | | |
|---|---|---|
| 2,479,367 | Joyce et al. | Aug. 16, 1949 |
| 2,584,126 | Hanford | Feb. 5, 1952 |
| 2,600,684 | Pearson | June 17, 1952 |
| 2,689,242 | Lucht | Sept. 14, 1954 |
| 2,771,457 | Barnec et al. | Nov. 20, 1956 |